Dec. 3, 1940.   R. L. TWEEDALE   2,223,838
POWER TRANSMISSION
Filed Dec. 15, 1936   2 Sheets-Sheet 1
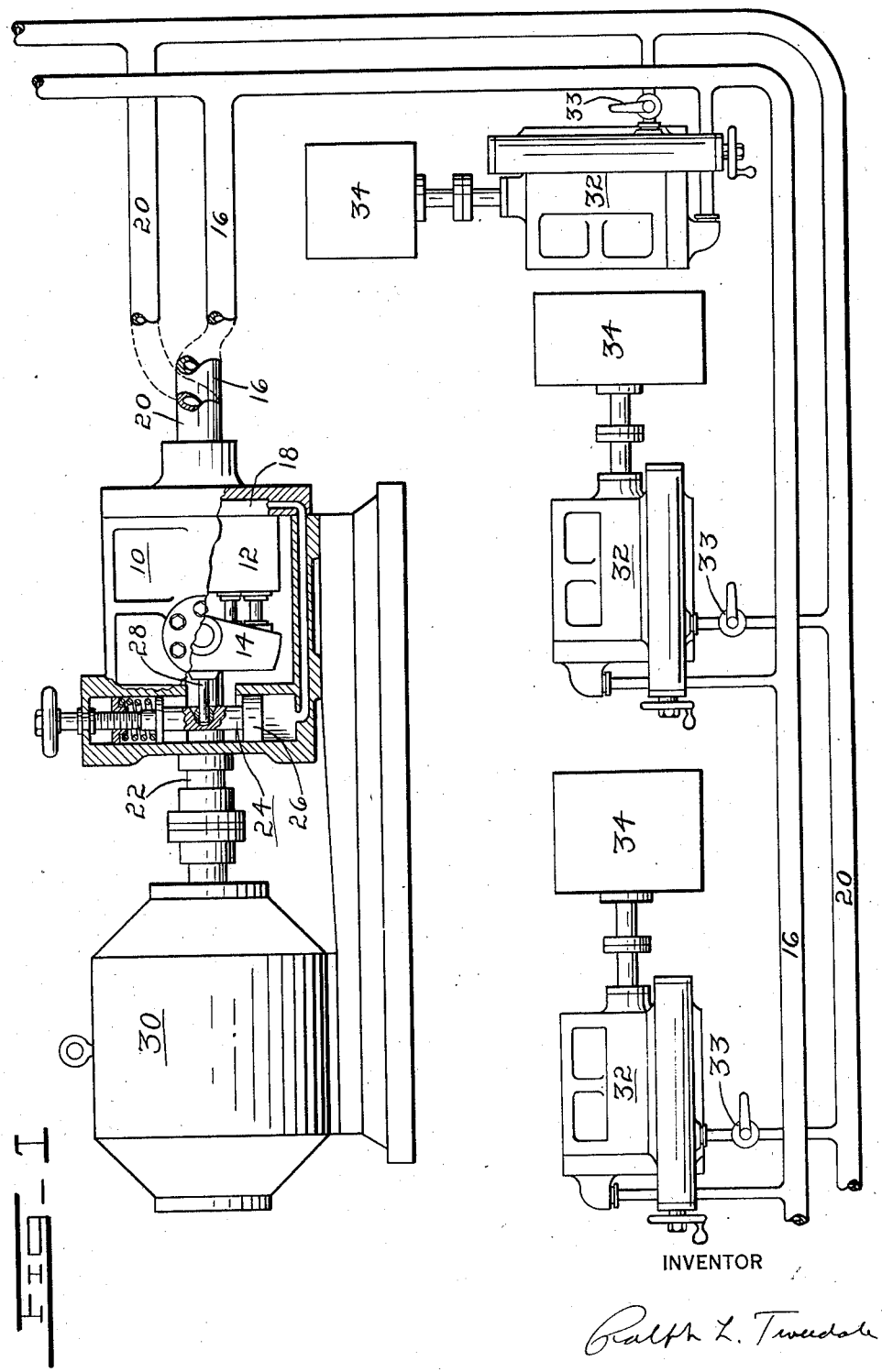
INVENTOR
Ralph L. Tweedale

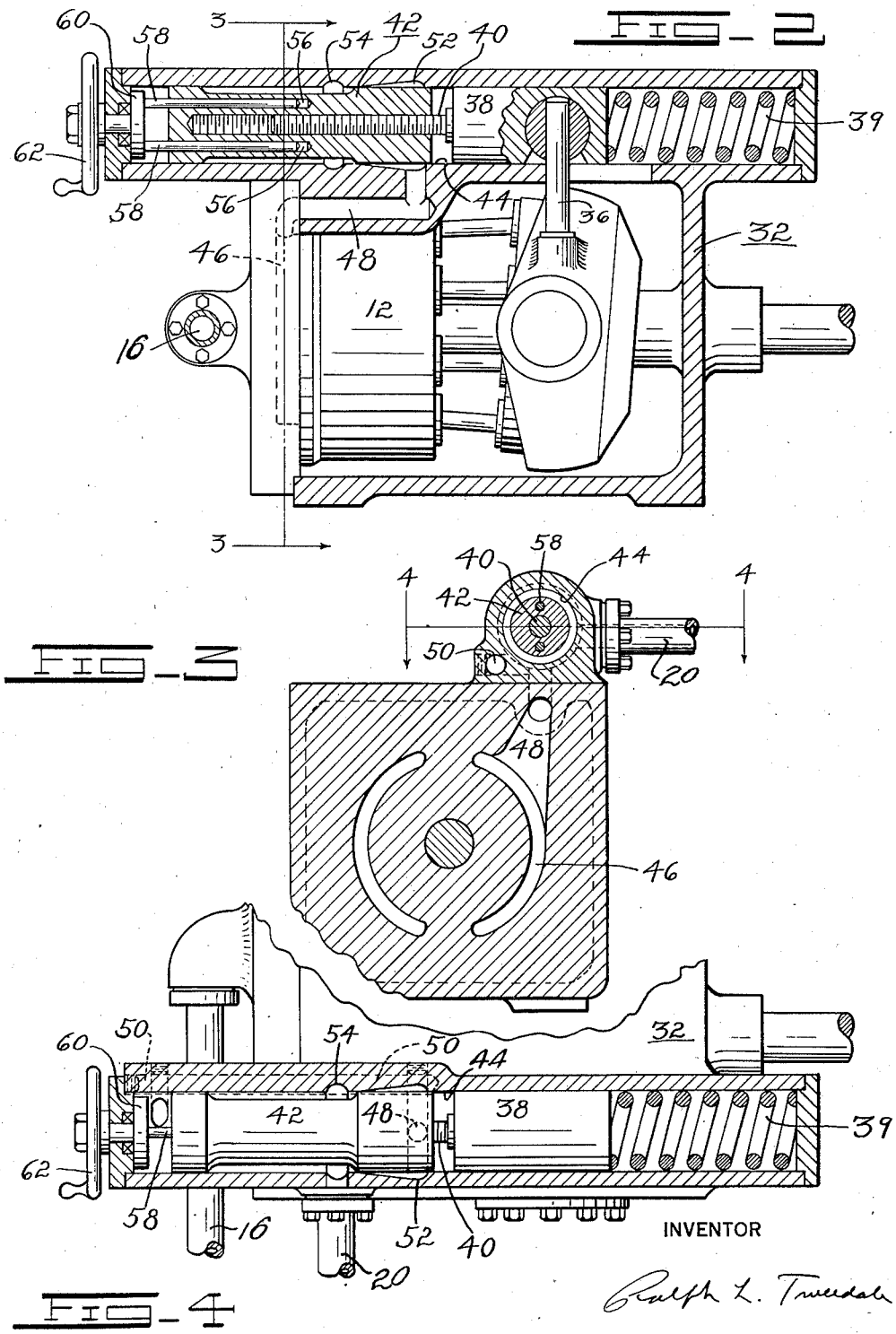

Patented Dec. 3, 1940

2,223,838

UNITED STATES PATENT OFFICE 2,223,838

POWER TRANSMISSION

Ralph L. Tweedale, Waterbury, Conn., assignor to The Waterbury Tool Company, Waterbury, Conn., a corporation of Connecticut Application December 15, 1936, Serial No. 115,988

6 Claims. (Cl. 60—97)

This invention relates to power transmissions, particularly to those of the type comprising two or more fluid pressure energy translating devices one of which may function as a pump and another as a fluid motor. The invention is particularly concerned with systems utilizing a plurality of fluid motors connected to a common source of pressure fluid at constant pressure wherein each of the fluid motors may be independently controlled and regulated as to speed regardless of variations in the torque load applied to the motor.

There are many examples of power transmission installations in which a large number of independent machine units or sections of a machine are driven from a common source of power, as for example in a factory. It is necessary that each unit be capable of control as to speed independently of all the other units. In many instances, it is desirable to provide some means for varying the speed of the machine unit smoothly over a considerable range.

Hydraulic power transmission devices afford a ready means of providing smoothly variable speeds; that is without steps, but heretofore have required a complete individual pump and motor transmission unit for each machine unit being driven. It is well-known that if a plurality of fluid motors be connected in parallel to a common pump that the fluid, following the path of least resistance, will operate only that motor which has the least resisting load so that it is impossible to insure driving two or more motors at different speeds or loads. Likewise, if the motors be connected in series to a common pump, equally great practical difficulties are encountered since it is necessary to operate the common pump against a pressure head equal to the sum of the pressures across each motor, and if any considerable number of motors are used, the pump pressure becomes excessive or if this is to be avoided, the size of the motor required is too great.

It is an object of the present invention to provide a multiple unit hydraulic power transmission system wherein a common pump or other source supplies fluid at constant pressure to a plurality of fluid motors, each of which may be automatically regulated to drive a load device at any desired speed against varying load torques, and to provide a novel fluid motor and control mechanism suitable for such a system.

Further objects and advantages of the present invention will be apparent from the following description, reference being had to the accompanying drawings wherein a preferred form of the present invention is clearly shown.

In the drawings:

Fig. 1 is a diagrammatic view of a power transmission system incorporating a preferred form of the present invention.

Fig. 2 is a side view partly in section of a fluid motor and control mechanism forming one of the elements of the system of Fig. 1.

Fig. 3 is a cross section on line 3—3 of Fig. 2.

Fig. 4 is a cross section on line 4—4 of Fig. 3.

Referring now to Fig. 1 there is illustrated a source of fluid pressure comprising a variable displacement pump 10 which may be of any suitable construction and is shown as of the well-known "Waterbury" type comprising a revolving cylinder barrel 12 having parallel cylinder bores within which pistons are reciprocated by means of a tilting box and socket ring assembly 14. Fluid is drawn into the cylinder bores from a return conduit 16 through an arcuate valve port and is delivered to an arcuate valve port 18 and pressure conduit 20. The quantity of fluid delivered is determined by the inclination of the tilting box 14 relative to the main shaft 22, the position of the tilting box being controlled by a constant pressure regulating mechanism 24 comprising a spring-loaded piston 26 which is connected to a tilting box operating stud 28 and operates to increase the displacement of the pump upon a decrease in pressure in the line 20 and to decrease the displacement of the pump upon an increase in pressure in the line 20.

The shaft 22 may be driven from a suitable prime mover, such as an electric motor 30. The conduits 16 and 20 are connected to a plurality of fluid motors 32 so that the motors are in parallel with the pump 10. A hand valve 33 is interposed in each branch of the line 20 adjacent each motor 32. Each of the motors drives an independent load device indicated diagrammatically at 34.

The construction of the motors and the control mechanism incorporated in each is illustrated in Figs. 2 through 4. The revolving parts of the motor 32 may be similar to those of the pump 10, the tilting box operating stud 36 extending vertically from the top thereof for controlling the displacement of the motor 32. The stud 36 is operated by a piston 38 biased to the left by a spring 39.

The piston 38 carries a threaded stem 40 which engages a piston valve member 42 slidable in the bore 44. The left-hand end of the valve member 42 is subject to fluid pressure existing in the valve port 46 through a conduit 48 and branch conduit 50 (Fig. 4). The conduit 48 communicates with a tapered groove 52 in the bore 44. The pressure line 20 communicates with bore 44 at a groove 54. The valve 42 controls communication between the grooves 52 and 54 to vary the volume of fluid supplied to the motor 32.

For the purpose of adjusting the relative positions of valve 42 and piston 38 the valve is provided with a pair of longitudinal bores 56 within which pins 58 are slidably received. The pins 58 are secured to a plate 60 which may be turned by a handwheel 62 to rotate the valve 42 and adjust its longitudinal position on the stem 40. It will thus be seen that the quantity of fluid supplied from conduit 20 to valve port 46 is controlled by the opening of valve 42 which is varied according to the pressure existing in port 46. Likewise, the displacement of the motor 32 is controlled in substantial proportion to the pressure existing in the valve port 46.

In operation the prime mover 30 is started causing the pump 10 to deliver fluid to conduit 20. The quantity delivered is automatically varied to maintain a constant pressure in the conduit 20 by the pressure regulating mechanism 24. If it is desired to start one of the load devices 34, the valve 33 may be operated to open communication from line 20 to valve 42. The spring 39 holds the piston to the left in minimum displacement position before valve 33 is opened. By operating handwheel 62 the valve 42 may be screwed slightly to the right from the position shown so that fluid is admitted to groove 52 and port 46. Due to the resisting torque of the load 34, pressure is built up in valve port 46 and this pressure acting on the left end of valve 42 causes the piston 38 and valve 42 to move to the right until the displacement of motor 32 is great enough for the pressure in valve port 46 to overcome the resisting load. Thereupon the motor starts to turn, driving the load device 34. If the starting load happened to be such that the piston 38 in moving to the right sufficiently to permit the motor to start, carried the valve 42 too far to the right for operation at the desired speed; then the handwheel 62 may be operated to screw the valve 42 back to the left to reduce the volume of fluid supplied without reducing the stroke of the motor. This has the effect of reducing the motor speed without reducing the torque developed. If an increase in load occurs, the pressure in valve port 46 increases, thus increasing the motor displacement and increasing the opening at valve 42. No decrease in speed occurs, however, due to the simultaneous increase in quantity of fluid delivered through valve 42. Likewise, on a decrease in load the pressure in valve port 46 decreases permitting piston 38 and valve 42 to move back to the left under the urge of spring 39, thus decreasing the motor displacement and decreasing the quantity delivered through valve 42. The speed of the motor 32 is thereby kept substantially constant over a wide range of load fluctuations and independently of all the other motors connected to the lines 16 and 20.

The speed at which the motor 32 thus operates may be varied by operation of handwheel 62. If this be operated to move valve 42 to the right relative to piston 38 the speed is increased, since a greater quantity is delivered to valve port 46 for any given motor displacement. If the valve 42 be moved to the left relative to piston 38, the motor speed is correspondingly decreased.

While the form of embodiment of the invention as herein disclosed, constitutes a preferred form, it is to be understood that other forms might be adopted, all coming within the scope of the claims which follow.

What is claimed is as follows:

1. In a power transmission system the combination with a source of fluid under predetermined pressure, of a plurality of variable displacement fluid motors connected in parallel with the source, an independent, variable torque load device connected to each fluid motor, means associated with each motor for controlling the displacement thereof and means associated with each motor for controlling the quantity of fluid supplied thereto in a manner to maintain the motor speed substantially constant under varying load torque, said control means being simultaneously operable and responsive to motor intake pressure.

2. In a power transmission system the combination with a source of fluid under predetermined pressure, of a plurality of variable displacement fluid motors connected in parallel with the source, an independent, variable torque load device connected to each fluid motor, means associated with each motor for controlling the displacement thereof, means associated with each motor for controlling the quantity of fluid supplied thereto in a manner to maintain the motor speed substantially constant under varying load torque, said control means being simultaneously operable and responsive to motor intake pressure, and adjusting means for varying the response of one control means to pressure variations independently of the response of the other control means whereby the motor speed may be adjusted.

3. A fluid motor adapted to drive a variable torque load at substantially constant speed when energized with fluid at constant pressure comprising in combination means for varying the displacement of the fluid motor, means for varying the quantity of fluid supplied to the motor and means for controlling the displacement and quantity varying means simultaneously in response to variations in motor intake pressure in a manner to maintain the motor speed substantially constant under varying load torque.

4. In a power transmission system the combination with a source of fluid under predetermined pressure, of a plurality of variable displacement fluid motors connected in parallel with the source, an independent, variable torque load device connected to each fluid motor, means associated with each motor for controlling the displacement thereof, means associated with each motor for controlling the quantity of fluid supplied thereto in a manner to maintain the motor speed substantially constant under varying load torque, said means comprising a displacement regulator responsive to motor intake pressure and a motor intake throttle valve respectively, and means for operating the valve and displacement regulator simultaneously to increase the displacement and to open the valve in response to an increase in pressure between the valve and the fluid motor.

5. In a power transmission system the combination with a source of fluid under predetermined pressure, of a plurality of variable displacement fluid motors connected in parallel with the source, an independent, variable torque load device connected to each fluid motor, means associated with each motor for controlling the displacement thereof, means associated with each motor for controlling the quantity of fluid supplied thereto in a manner to maintain the motor speed substantially constant under varying load torque, said means comprising a displacement regulator responsive to motor intake pressure and a motor intake throttle valve respectively, means for operating the valve and displacement regulator simultaneously to increase the displacement and to open the valve in response to an increase in pressure between the valve and the fluid motor, and adjusting means for varying the constant speed at which the motor is controlled by the first means.

6. In a power transmission system the combination with a source of fluid under predetermined pressure, of a plurality of variable displacement fluid motors connected in parallel with the source, an independent, variable torque load device connected to each fluid motor, means associated with each motor for controlling the displacement thereof, means associated with each motor for controlling the quantity of fluid supplied thereto in a manner to maintain the motor speed substantially constant under varying load torque, said means comprising a displacement regulator responsive to motor intake pressure and a motor intake throttle valve respectively, means for operating the valve and displacement regulator simultaneously to increase the displacement and to open the valve in response to an increase in pressure between the valve and the fluid motor, and means for varying the relative positions of the valve and the displacement regulator independently of said operating means.

RALPH L. TWEEDALE.